T. L. JOHNSON.
MUD GUARD.
APPLICATION FILED JAN. 28, 1914.
1,108,759.
Patented Aug. 25, 1914.
2 SHEETS—SHEET 1.
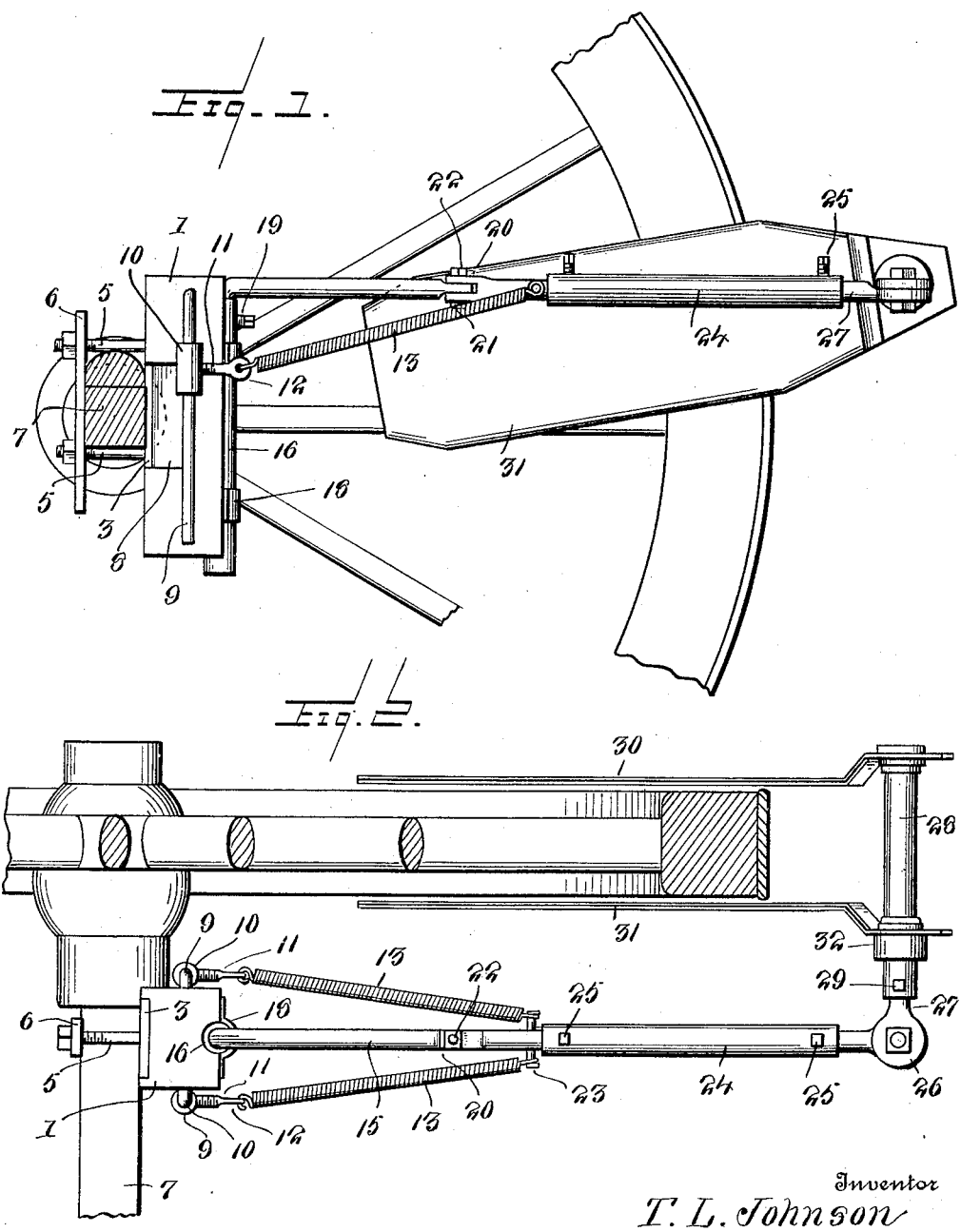
Witnesses
E. R. Ruppert
R. M. Smith
Inventor
T. L. Johnson
By Victor J. Evans
Attorney T. L. JOHNSON.
MUD GUARD.
APPLICATION FILED JAN. 28, 1914.
1,108,759.
Patented Aug. 25, 1914.
2 SHEETS—SHEET 2.
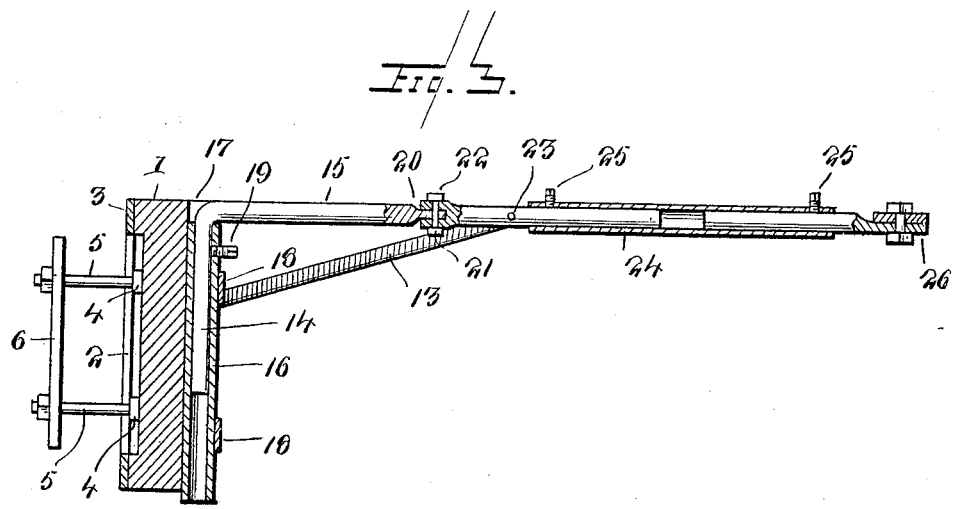
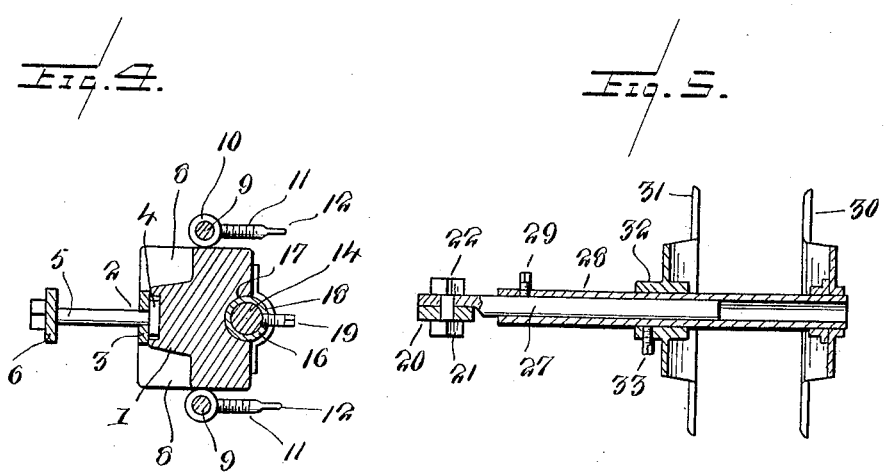
Witnesses
E. R. Ruppert
R. M. Smith
Inventor
T. L. Johnson
By Victor J. Evans
Attorney

UNITED STATES PATENT OFFICE.

TOM L. JOHNSON, OF PANNA MARIA, TEXAS, ASSIGNOR OF ONE-THIRD TO VALENTINE BIELA, OF CESTOHOWA, TEXAS.

MUD-GUARD.

1,108,759.

Specification of Letters Patent. Patented Aug. 25, 1914.

Application filed January 28, 1914. Serial No. 815,050.

*To all whom it may concern:*

Be it known that I, TOM L. JOHNSON, a citizen of the United States, residing at Panna Maria, in the county of Karnes and State of Texas, have invented new and useful Improvements in Mud-Guards, of which the following is a specification.

This invention relates to mud guards, the object in view being to provide a mud guard in the form of an attachment capable of being applied to any vehicle for the purpose of preventing the accumulation of mud on the wheels and tires, the mud guard serving to scrape the surplus mud from the tires and wheels as fast as it adheres thereto.

A further object of the invention is to so construct the attachment as to adapt it to be applied to a wheel of any size, the device being applicable to an axle of any size and the scrapers or cutters being so arranged as to accommodate themselves to any irregularity or wabbling of the wheel in connection with which the device is used.

With the above and other objects in view, the invention consists in the construction, combination and arrangement of parts, as will hereinafter be more fully described, illustrated and claimed.

In the accompanying drawings: Figure 1 is a side elevation showing the mud guard of this invention applied to a wheel and axle. Fig. 2 is a plan view of the same. Fig. 3 is a vertical longitudinal section taken in line with the main supporting arm. Fig. 4 is a cross section taken horizontally through the supporting block and clamp. Fig. 5 is a detail section taken longitudinally of the blade carrying sleeve showing the adjusting means for the scraper blades.

Referring to the drawings, 1 designates a head block forming a base or support for the rest of the mud guard hereinafter particularly described. The head block 1 ordinarily stands in a vertical position and is provided in one side thereof with a slot 2 extending longitudinally thereof. The slot 2 is preferably formed in a plate 3 fixedly secured to the block 1 and arranged in a recess which is enlarged to receive the heads 4 of a pair of bolts 5 which pass through a connecting plate or bar 6 adapted to fit against the opposite side of an axle shown at 7. In this way a clamp is formed for securing the head block 1 in fixed relation to the axle so as to support the remainder of the device. The head block is also formed at opposite sides thereof with recesses 8 to accommodate the hubs of the wheels in connection with which it is used thus enabling the device as a whole to be set close up to a wheel on either side of the machine or vehicle. The head block 1 is further provided with guide rods 9 extending longitudinally of opposite sides thereof and mounted on said rods 9 are sleeves 10 capable of being adjusted lengthwise of their respective rods and held at any desired point by means of set screws 11 having terminal eyes 12 to receive the inner ends of a pair of coiled contractile springs 13 the purpose of which will hereinafter appear. In addition to the head block 1 formed as above described, the mud guard comprises a main supporting arm which is L-shaped, comprising the vertical attaching portion 14 and the horizontally projecting arm 15. The portion 14 is received in a tubular holder or socket piece 16 set into a groove or recess 17 in the adjacent side of the head block, the tube being held in place by means of straps 18 or the equivalent thereof. Said tube also carries a set screw 19 which impinges against the portion 14 of the main supporting arm to prevent said arm from swinging laterally after the mud guard has been set in proper relation to the wheel.

The horizontal portion 15 of the main supporting arm is divided intermediate its ends and formed with a hinge joint at 20, 21 designating a clamp and pivot bolt passing through the joint and having a clamping nut 22 thereon. This enables the outer portion of the main supporting arm to be adjusted with relation to its angle to the inner portion of said arm in order to accommodate the scraping blades to wheels which are more or less dished. Extending transversely through the extension of the arm referred to is a pin 23 to which the adjacent extremities of the contractile springs above referred to are attached. Therefore, these springs serve to hold the extension arm in proper relation to the wheel while permitting the extension arm as well as the scraping blades to move laterally with respect to the direction of movement of the vehicle in order to accommodate any wabbling of the wheel.

Mounted upon the extension arm is a sleeve 24 carrying one or more set screws 25 enabling said sleeve to be adjusted outwardly and inwardly on the extension arm for the purpose of lengthening and shortening said arm to accommodate the device to wheels of different diameters. Connected by a hinged joint 26 to the outer extremity of the sleeve just referred to is a laterally projecting shaft 27 which is intended to reach across the periphery or tire of the wheel out of contact therewith and mounted upon said shaft is an adjustable sleeve 28 carrying one or more set screws 29 to provide for setting said sleeve at any point lengthwise of said shaft.

Secured in fixed relation to the outer end of the sleeve 28 is a scraper blade 30 while between the scraper blade 30 and the main supporting arm there is another scraper blade 31 having a hub 32 which embraces the sleeve 28 and is held at any desired adjustment thereon by a set screw 33. This provides for adjusting the distance between the two scraper blades and also setting the two scraper blades in line with each other and in proper relation to the wheel in conjunction with which they operate. The opposite longitudinal edges of the blades are preferably flared slightly away from the wheel and rim so as not to cut into the same and in practice the blades will be set slightly farther apart than the thickness of the rim and tire so that while they will operate in close proximity thereto they will not come in actual contact therewith. A sufficient thickness or film of mud will thus be left on the wheel rim and tire to protect the same from injury by the scraping blades.

By means of the construction hereinabove described and illustrated in the accompanying drawings, it will now be seen that the blades serve to remove the adhering mud and trash from the wheels and tires as fast as it is picked up thereby. It will also be seen that the scraping blades adjust themselves readily to the wheel and tire where such wheel is untrue and that the device as a whole may be adjusted to wheels of different sizes and diameters; also that the device may be adjusted to fit straight or dished wheels.

What I claim is:

1. In a device of the class described, a supporting head block, means for securing said block to a vehicle axle, a main supporting arm having a jointed connection with said block and embodying a pivotally mounted extension, spring mechanism for centering said pivoted extension, and a pair of oppositely arranged scraper blades carried by said pivoted extension and operating at opposite sides of the wheel.

2. In a device of the class described, a supporting head block, means for clamping said block to a vehicle axle, a pivoted arm connected with said head block, oppositely arranged springs for centering said pivoted arm, said springs being interposed between said arm and head block, and a pair of oppositely arranged scraping blades carried by said pivoted arm and working at opposite sides of the wheel.

3. In a device of the class described, a supporting head block, clamping means for securing said head block to a vehicle axle, guide rods extending longitudinally of said head block at opposite sides thereof, a laterally swinging arm supported by said head block, oppositely arranged arm centering springs connected with said arm and having an adjustable connection with said guide rods, and a pair of oppositely arranged scraping blades carried by said arm and adapted to operate at opposite sides of the wheel.

In testimony whereof I affix my signature in presence of two witnesses.

TOM L. JOHNSON.

Witnesses:
JOHN ADAM LORENZ,
TOM OLDER NEAL.

Copies of this patent may be obtained for five cents each, by addressing the "Commissioner of Patents, Washington, D. C."